United States Patent
Portz

(10) Patent No.: US 12,346,225 B2
(45) Date of Patent: Jul. 1, 2025

(54) INCREMENTAL BLOCK VOLUME RESTORE FOR OPTIMIZED BACKUP EXPORT

(71) Applicant: Oracle International Corporation, Redwood Shores, CA (US)

(72) Inventor: Travis John Portz, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/633,242

(22) Filed: Apr. 11, 2024

(65) Prior Publication Data

US 2024/0394153 A1 Nov. 28, 2024

Related U.S. Application Data

(60) Provisional application No. 63/469,013, filed on May 25, 2023.

(51) Int. Cl.
*G06F 11/10* (2006.01)
*G06F 11/14* (2006.01)

(52) U.S. Cl.
CPC ...... *G06F 11/1469* (2013.01); *G06F 11/1451* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2004/0267836 | A1* | 12/2004 | Armangau | G06F 11/1435 707/999.203 |
| 2009/0313503 | A1* | 12/2009 | Atluri | G06F 11/1464 714/E11.023 |
| 2021/0081111 | A1* | 3/2021 | Larsen | G06F 11/3034 |
| 2021/0160317 | A1* | 5/2021 | Portz | G06F 11/3006 |
| 2022/0091742 | A1* | 3/2022 | Littlefield | G06F 11/1448 |
| 2023/0273865 | A1* | 8/2023 | Fay | G06F 11/1469 707/679 |

* cited by examiner

*Primary Examiner* — Jau Shya Meng
(74) *Attorney, Agent, or Firm* — Kilpatrick Townsend & Stockton LLP

(57) ABSTRACT

Techniques are described that include receiving, by a computing system, a request to create a restored block volume using a first manifest, the first manifest comprising: (i) a block identifier for a block and (ii) a first block sequence number corresponding to the block identifier and associated with a first snapshot, and (iii) a manifest identifier. The techniques further include receiving, by the computing system, the request to create the restored block volume using a second manifest, the second manifest comprising: (i) the block identifier for the block, (ii) a second block sequence number corresponding to the block identifier and associated with a second snapshot. The techniques further include determining, by the computing system, whether the second block sequence number is indicative of the block having been altered after the first manifest was generated, and responsive to the determination by the computing system, creating the restored block volume.

20 Claims, 6 Drawing Sheets

INCREMENTAL BLOCK VOLUME RESTORE FOR OPTIMIZED BACKUP EXPORT

CROSS-REFERENCES TO RELATED APPLICATIONS

The present application claims priority of U.S. Provisional Application No. 63/469,013, filed May 25, 2023, and entitled "INCREMENTAL BLOCK VOLUME RESTORE FOR OPTIMIZED BACKUP EXPORT", the entirety of which is incorporated by reference herein.

BACKGROUND

Creating a snapshot of data is useful for retaining the availability of data. There are many needs for creating a snapshot of data. For example, a snapshot may be generated so that the data as existing at the time of backup is accessible by other machines, such as in the case of a system failure that requires data to be restored from a snapshot. Further, there are many needs for being able to restore data using a snapshot. For example, a system may be operating using a first snapshot that reflects an earlier version of the system than what is available in a second snapshot. Thus, the second snapshot may be used to bring the system operation into conformance with the second snapshot. However, there are several problems with current techniques for obtaining and using snapshots. These problems lead to increased use of resources and longer runtimes.

SUMMARY

The present disclosure relates to generating incremental snapshots. Embodiments described herein may include methods and systems for generating incremental snapshots, and partially or fully restoring from generated incremental snapshots. Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

Techniques (e.g., systems, methods, computer-readable mediums) are described that include receiving, by a computing system, a request to create a restored block volume using a first manifest, the first manifest comprising: (i) a block identifier for a block and (ii) a first block sequence number corresponding to the block identifier and associated with a first snapshot, and (iii) a manifest identifier. The techniques further include receiving, by the computing system, the request to create the restored block volume using a second manifest, the second manifest comprising: (i) the block identifier for the block, (ii) a second block sequence number corresponding to the block identifier and associated with a second snapshot. The techniques further include determining, by the computing system, whether the second block sequence number is indicative of the block having been altered after the first manifest was generated, and responsive to the determination by the computing system, creating the restored block volume.

Implementations may include one or more of the following features. The method where determining whether the second block sequence number is indicative of the block having been altered after the first manifest was generated may include: comparing the second block sequence number to the manifest identifier; and determining whether the second block sequence number was changed after the first manifest was generated. The method may include: comparing the first block sequence number to the second block sequence number. Creating the restored block volume may include: creating an empty block volume. Determining whether the second block sequence number was changed after the second manifest was generated may include: determining whether the second block sequence number is greater than the manifest identifier. Determining whether the second block sequence number was changed after the first manifest was generated may indicate that the second snapshot associated with the block identifier includes a more recent write operation to the block. Creating the restored block volume may include: creating the restored block volume with one of: (i) the first snapshot or (ii) the second snapshot. Creating the restored block volume with one of: (i) the first snapshot or (ii) the second snapshot further may include: creating the restored block volume with one of: (i) a first portion of the first snapshot or (ii) a second portion of the second snapshot. The first snapshot may include a point-in-time capture of the block of a block volume and the second block sequence number may include at least one of: a number, a character, or a hash value. The block may have been altered if the block is updated, allocated, or deallocated. The second manifest may be generated, the generation may include: reading blocks in a memory volume to detect that the block has been altered; obtaining the first manifest associated with the first snapshot; and generating the second manifest by using the first manifest, the second manifest generated by using the second block sequence number, the second block sequence number generated by changing the first block sequence number included within the first manifest. The first manifest may be based at least in part on a prior manifest, and the second snapshot may be a remotely stored snapshot. The method may include: receiving, by the computing system, a second request to list a set of blocks included in the restored block volume. The second block sequence number may be a predetermined value when the block has been deallocated or unallocated. The first block sequence number may correspond to the second block sequence number if they both are associated with a same block identifier that corresponds to a same block. Implementations of the described techniques may include hardware, a method or process, or computer software on a computer-accessible medium.

The foregoing, together with other features and embodiments will become more apparent upon referring to the following specification, claims, and accompanying drawings.

DETAILED DESCRIPTION

The present disclosure relates to generating incremental snapshots. More specifically, improved techniques are disclosed that improve the efficiency of generating snapshots of a block volume and restoring block volumes using snapshots.

In certain embodiments, a manifest may be generated at a first time. The manifest may reflect changes that have been made to a block volume of data since a prior time. Changes may be in the form of one or more blocks being deallocated, initialized, or having their data contents changed. Blocks of a block volume may be identified with a corresponding block identifier. Further, the manifest may associate changes to a block (e.g., changes since a last manifest was generated) by updating a sequence number that is associated with the block identifier in the manifest. A first snapshot may then be generated based on the sequence numbers of the first manifest. The first snapshot may include blocks of data that have been changed, and may not include additional blocks of data that have remained the same since a prior snapshot.

Further, in certain embodiments, the generated snapshots may be used to perform restores. A first manifest associated with a first snapshot may be compared to a second manifest associated with a second snapshot. When comparing the two manifests to one another, the sequence numbers corresponding to each block identifier may be compared and the most recently updated block sequence number may be determined. Once the most recently updated block sequence number is determined, the corresponding block from the corresponding snapshot may be used to perform a restore using the corresponding snapshot.

Due to the usefulness of snapshots, the capability to efficiently obtain a snapshot and use a snapshot can improve system performance by reducing the resources used, reducing the time to complete a backup, restore from a backup, and/or reducing the resources used by other systems being relied on for the backup.

There are currently several problems relating to snapshots. Some problems are that creating a snapshot can be resource intensive, time intensive, and be redundant. Further, some of the problems relate to restoring from a snapshot. Currently, restoring from a snapshot may require reading and/or writing more data than is necessary to generate a block volume that would be the same as the block volume represented by the snapshot. Further, problems exist regarding the capability of systems to identify which blocks have changed between snapshots of a block volume. Such problems may lead to increased processing times and resources being used with less efficiency.

The present disclosure describes techniques for solving the above-mentioned problems.

The foregoing, together with other features and embodiments will become more apparent upon referring to the following specification, claims, and accompanying drawings.

I. Generating an Incremental Backup

Figure 1:
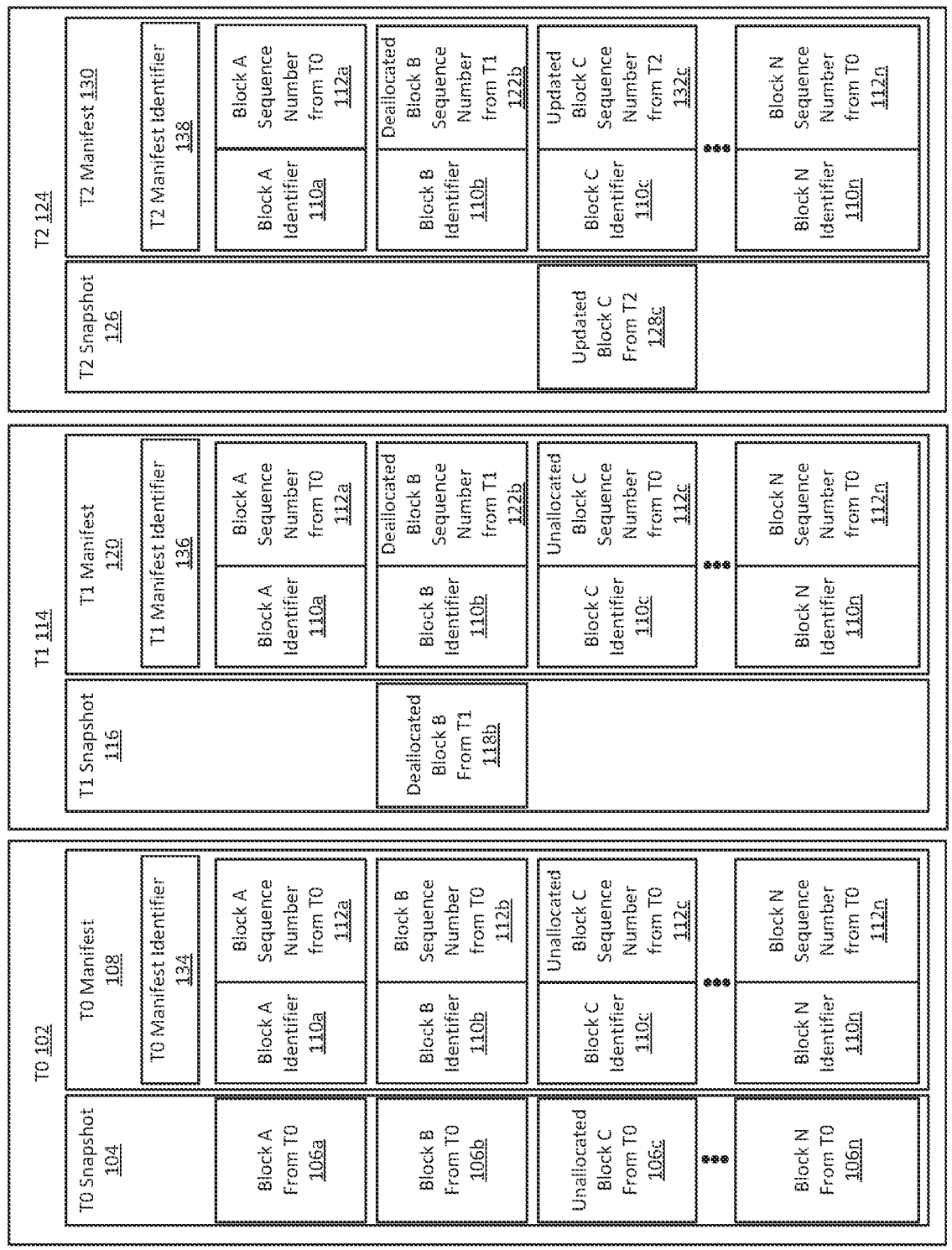
FIG. 1 is a simplified block diagram of incremental snapshots, according to an example embodiment.

FIG. 1 is a simplified block diagram of incremental snapshots, according to an example embodiment. FIG. 1 illustrates what snapshots and manifests may include at different points in time.

A block volume 132 may comprise one or more blocks of data, as represented by block A 134, block B 136, unallocated block C 138, through block N 140. A block volume 132 may be a detachable storage device that allows storage capacity (e.g., of an instance) to be dynamically changed (e.g., expanded). Block volumes 132 may be used in a cloud computing environment and may be used with virtual machines. Block volumes may include any number of unallocated blocks and/or allocated blocks.

A block (e.g., block A 134) may comprise data that has been associated with the block volume 132. A block volume 132 may provide storage space (e.g., for instances in the cloud, on a local hard drive, etc.). Blocks of a block volume 132 may be initialized, attached, connected, moved, and changed as needed to meet storage, performance, and application requirements. Blocks may be capable of being moved between two block volumes 132 without the block losing the data associated with the block.

In an embodiment, a block is fixed in size and may provide storage to an operating system, application, and/or virtual machine.

A snapshot may be generated for a block volume 132. A snapshot may allow for the creation of a point-in-time copy of the block volume 132. A snapshot may be used for backups, recovery of data, cloning, etc. A snapshot may be an incremental snapshot or a full snapshot. An incremental snapshot may include a subset of block volume 132 blocks (e.g., the changes since the last backup). A full snapshot may include all blocks of the block volume 132. A full snapshot may include changes to blocks of the block volume 132 since the block volume 132 was generated.

In an embodiment, a manifest can be generated at any point in time (e.g., based on time of day, based on an event occurring, based on a schedule, based on user input, etc.). A manifest may comprise one or more block identifiers and one or more block sequence numbers that are associated with the one or more block identifiers. Each of the block identifiers may correspond to a block of data in a block volume 132 of data. Thus, one or more blocks of data in a block volume 132 may be capable of being identified using the corresponding block identifier. For example, block A identifier 110*a* may correspond to block A from T0 106*a* and therefore block A identifier 110*a* may be capable of identifying block A from T0 106*a*.

The block identifier may be unique (e.g., unique to the block volume 132, universally unique across block volumes) and may refer to a location in memory where the data for the corresponding block is.

At time T0, a manifest may be generated (e.g., T0 manifest 108). The manifest may be generated by including block identifiers and block sequence numbers associated with each block in a block volume 132 that the manifest is associated with. The manifest is capable of providing information relating to the blocks of the block volume 132. For example, the manifest may be capable of representing which blocks: are included within a block volume 132, have changed with respect to an earlier point in time (e.g., since a prior manifest that was generated), have not been hydrated, have been deallocated, and/or have been initialized, etc. In certain embodiments the manifest has an identifier (e.g., a manifest sequence number) capable of uniquely identifying the manifest.

The block sequence numbers of the manifest may be initialized at a starting value the first time the block sequence number is associated with a block identifier corresponding to a block of the block volume 132. For example, if a first manifest generated for the block volume 132 is representative of block A 134, block B 136, unallocated block C 138, and block N 140, the first manifest may not have any block sequence numbers to use that have been previously associated with block A 134, block B 136, unallocated block C 138, and block N 140. In such a case, the block sequence numbers associated with the new blocks (block A 134, block B 136, unallocated block C 138, block N 140 in this case) may be initialized.

Block sequence numbers may be initialized and/or updated based on the time (e.g., day, hour, second, and/or year, etc.) that the block was initialized or updated, what other block sequence numbers are included within the manifest, the content of the block (e.g., the block is unallocated or deallocated), how many changes have been made to the block that corresponds to a block identifier that is associated with the block sequence number, a received parameter (e.g., from a user), based on a manifest sequence number or other manifest identifier, and/or may be initialized to a predefined value (e.g., zero), randomized, etc. Block sequence numbers mays be numerical, alphanumerical, a character string, etc.

In certain embodiments, the manifest may not include a block sequence number for one or more block identifiers. For example, in an embodiment, a block sequence number may be null or a predetermined value (e.g., zero) when the block corresponding to the block identifier that is associated with the block sequence number has been deallocated. In certain embodiments, the manifest may include a block sequence number for one or more block identifiers that is set to a value (e.g., 0) representing that the block has not been hydrated and does not include any data to be used in a snapshot.

If no manifest has been generated for a block volume 132, the first manifest representative of the block volume 132 may include a block identifier for each block in the block volume 132 and an initialized block sequence number associated with each block identifier in the manifest. The first manifest may be generated by determining which blocks are included in the block volume 132.

Further, since an incremental snapshot is a record of all the changes since the last snapshot (e.g., the last snapshot may be incremental or full), if a first snapshot is generated for a volume as an incremental snapshot, it may effectively be a full snapshot. In other words, because an incremental snapshot may record changes since the last snapshot, if there is not previous snapshot to use as a reference, then the incremental snapshot is effectively the first snapshot and will encompass a full block volume 132.

As an example, at time T0, a block volume 132 may not yet be represented by a manifest and/or snapshot. The block volume 132 may comprise one or more blocks, such as block A 134, block B 136, unallocated block C 138, through block N 140. Thus, if a T0 manifest 108 was generated for the block volume 132, an identifier for each block and a block sequence number for each block would be generated in the T0 manifest 108.

Accordingly, block A 134 from the block volume 132 may correspond to a block A 134 identifier and the block A 134 identifier may be associated with a block A sequence number from T0 112a. The block A sequence number from T0 112a may be initialized (e.g., to equal "1") upon the first time the block has been identified in the block volume 132 and represented by a manifest that is representative of the block volume 132. In certain embodiments, the block (e.g., block A sequence number from T0 112a) may be initialized based on a relationship to the manifest (e.g., T0 manifest 1008).

For example, the manifest identifier equals 1, and causes the block A sequence number from T0 112a to also equal 1.

Further, block B 136 from the block volume 132 may correspond to a block B identifier 110b and the block B identifier 110b may be associated with a block B sequence number from T0 112b. The block B sequence number from T0 112b may be initialized (e.g., to equal "1") upon the first time the block has been identified in the block volume 132 and represented by a manifest that is representative of the block volume 132. In some embodiments, the block B sequence number from T0 112b is initialized to a value (e.g., 2, 2A, random value, etc.) based at least in part on the other assigned block sequence numbers because one or more other block sequence numbers may have already been initialized and/or updated. In certain embodiments, the block sequence number is initialized based on an manifest identifier of a manifest the block sequence number will be included within.

Additionally, unallocated block C 138 from the block volume 132 may correspond to a block C identifier 110c and the block C identifier 110c may be associated with an unallocated block C sequence number from T0 112c. The unallocated block C sequence number from T0 112c may be initialized (e.g., to equal "0") upon the first time the block has been identified in the block volume 132 and represented by a manifest that is representative of the block volume 132 because the block is unallocated. Specifically, the unallocated block C sequence number from T0 112c associated with the block C identifier 110c may be a non-hydrated block sequence number associated with the block C identifier 110c that corresponds to the unallocated block C 138. A block sequence number representative of a non-hydrated block may be recognized during a restore process and a determination may be made to not write the block or restore anything using a snapshot for the block Furthermore, any number of additional blocks may be associated with a corresponding block identifier that may be associated with a block sequence number, as represented by block N 140, a block N identifier 106n, and a block N sequence number 112n from T0.

The T0 manifest 108 (e.g., via the block sequence numbers) may be capable of being used to determine which blocks of the block volume 132 should be included in the T0 snapshot 104. In a case where all of the block sequence numbers are indicative of the block corresponding to the block identifier associated with the block sequence number having not yet been included in a previous snapshot (e.g., all of the block sequence numbers are in a newly initialized state), then all of the blocks will be included in the T0 snapshot 104. Such a T0 snapshot 104 would be a full block volume 132 snapshot because the snapshot is the first incremental snapshot.

At time T1, a second snapshot may be generated. The snapshot may be generated as a result of input (e.g., user input, input from a system), a change to the block volume 132 occurring, a scheduled snapshot, a time of day, any number of blocks of the block volume 132 having been changed, and/or a specific block in the block volume 132 having been changed, other conditions, etc.

A T1 manifest 120 may be generated for representing the status of the block volume 132 at time T1. In some embodiments, a new manifest (e.g., T1 manifest 120) may be generated using the prior manifest (e.g., T0 manifest 108). Thus, the new manifest may be generated so that initially each block identifier and block sequence number is the same as in the prior manifest. The block sequence numbers in the new manifest may then be updated when the block corresponding to the associated block identifier is altered and/or to reflect that the block corresponding to the associated block identifier has been altered.

As an example, if the block sequence numbers for block A 134, block B 136, and block N 140 were all initialized to equal "1" in the T0 manifest 108, the block sequence numbers associated with the same block identifiers in the T1 manifest 120 may also be set to equal "1" when the T1 manifest 120 is generated. Further, if the block sequence number for unallocated block C 138 was initialized to equal "0" in the T0 manifest 108 (e.g., because the block is unallocated), the block sequence number associated with the same block identifier in the T1 manifest 120 may also be set to equal "0" when the T1 manifest 120 is generated. Furthermore, Block B 136 in the block volume 132 may have been altered (e.g., deallocated, updated, allocated, etc.). Thus, the T1 manifest 120 may then update (e.g., increment) the block B sequence number to generate an deallocated block B sequence number from T1 122*b* that has a different value compared to the block B sequence number from T0 112*b*. The deallocated block B sequence number from T1 122*b* may be associated with the block B identifier 110*b* that corresponds to block B 136 from the block volume 132. In certain embodiments, the deallocated block B sequence number from T1 122*b* may be set based on a manifest identifier (e.g., manifest sequence number), a previous block sequence number, and/or a previous manifest identifier. In certain embodiments, the deallocated block B sequence number from T1 122*b* may be set based on a predetermined value (e.g., deallocated blocks have a sequence number of 0).

In an embodiment, when a block corresponding to a block identifier is altered, a manifest is generated (e.g., the T1 manifest 120) or updated and then any other blocks identified by the block identifiers in the second manifest are associated with the same block sequence numbers as in the prior manifest.

As an example of an embodiment referring to the T1 manifest 120, when block B 136 from the block volume 132 is deallocated, a T1 manifest 120 may be generated with an deallocated block B sequence number from T1 122*b*. The deallocated block B sequence number from T1 122*b* may be generated based on when the block was deallocated, the prior sequence number associated with the block identifier corresponding to the block, a previous block sequence number, and/or a previous manifest identifier, etc. The T1 manifest 120 may then be further populated with the other block identifier information and block sequence number information for the blocks that are included in the block volume 132, based on the blocks in the block volume 132 and/or the T0 manifest 108. Any number of other blocks from the block volume may have also been altered since the prior manifest and/or snapshot was generated, and the alteration may be reflected for more than one block in a manifest and/or snapshot.

Once a manifest has been generated (e.g., the T1 manifest 120), an incremental snapshot may be generated. The incremental snapshot may include blocks that have been altered (e.g., deallocated, updated, allocated, etc.) since the point in time when the last snapshot was generated (e.g., deallocated block B from T1 118*b*). The snapshot may include blocks that have been altered compared to the blocks included in a previous snapshot. The snapshot may be limited to such blocks. The blocks included in the snapshot may be determined based on the block sequence number associated with the block identifier that corresponds to the block in the block volume 132. The blocks included in the snapshot may be determined based on a manifest sequence number for the generated manifest. The blocks included in the snapshot may be determined based on a flag that is set and associated with the respective block (e.g., a block sequence number is set to zero and a flag is set indicating that the block was deallocated since the last manifest).

As an example, the T1 manifest 120 may include the same block identifiers as the T0 manifest 108. Further, the T1 manifest 120 may include any number of sequence numbers associated with a block identifier that are different from the block sequence numbers associated with the block identifiers in the T0 manifest 108. In the illustrated example, an deallocated block B sequence number from T1 122*b* associated with a block B identifier 110*b* may be different compared to a block B sequence number from T0 112*b*. Therefore, the difference in the sequence numbers (e.g., deallocated block B sequence number from T1 122*b* and block B sequence number from T0 112*b*) between the T0 manifest 108 and the T1 manifest 120 may act as an indication that block B 136, should be included in the T1 snapshot 116 as deallocated block B from T1 118*b* because block B 136 has been altered between the point in time represented by T0 and T1.

Similarly to how the T1 snapshot 116 may be generated using the T1 manifest 120, and the T1 manifest 120 may be generated using the T0 manifest 108 and/or T0 snapshot 104. A T2 incremental snapshot may be generated using a T2 manifest 130, and the T2 manifest 130 may be generated using the T1 manifest 120 and/or T1 snapshot 116.

Therefore, the blocks of the block volume 132 that have changed since the last snapshot and/or manifest may be included in a new snapshot and identified in a new manifest. Using the illustrated example, Block C of the block volume 132 may have been updated (e.g., become allocated) since the time the T1 manifest 120 was generated. Therefore, the T1 manifest 120 may not reflect that there has been a more recent change to unallocated block C 138. As a result, an updated block C sequence number from T2 132*c* may be associated with the block C identifier 110*c* that corresponds to block C of the block volume 132 within the T2 manifest 130. In the illustration, block C has been updated/altered since the T1 manifest 120 and therefore may be included in the T2 incremental snapshot.

In an embodiment, a new block may have been added to the block volume 132 since a prior snapshot, the new manifest may reflect that a new block has been added. For example, the new manifest may include a new block identifier and a new block sequence number. The new block sequence number may be initialized as already described (e.g., based on a predetermined value, based on one or more other sequence numbers, based on a manifest sequence number, based on the content of the block, etc.). The new block may then be included in an incremental snapshot that is generated using the new manifest.

In an embodiment, a block may have been deallocated from the block volume 132 since a prior snapshot, a new manifest may reflect that the block has been deallocated. For example, the new manifest may update the block sequence number of a block identifier that corresponds to the block of the block volume 132. The updated block sequence number may be set to a null value, or another value that is indicative of the block being deallocated. The block that has been deallocated may not be included in an incremental snapshot that is generated using the new manifest.

An additional example is provided to further describe the utility and value of incremental snapshots. In a scenario where a 16 TB block volume 132 is generated, 40 GB of the block volume 132 is modified, and then a full snapshot of the block volume 132 is generated, the volume backup size may be 40 GB. If an additional 4 GB of the block volume 132 was modified and an incremental snapshot was generated, the unique size of the incremental backup will be 4 GB. If the full snapshot is subsequently deleted, the incremental snapshot will retain the full 44 GB necessary to restore the block volume 132 contents.

Yet an additional example is provided to further describe the utility and value of incremental snapshots. In a scenario where a 16 TB block volume 132 is generated, 40 GB of the block volume 132 is modified, and then a full snapshot of the block volume 132 is generated, the volume backup size may be 40 GB. If an additional 4 GB of the block volume 132 was modified and an incremental snapshot was generated, the unique size of the incremental backup will be 4 GB. In this example, if there was a third incremental snapshot of non-overlapping blocks, with a size of 1 GB, generated after the second incremental snapshot, and then the full snapshot is deleted, the third backup would stay at a 1 GB size, and the second incremental snapshot size would be updated to 44 GB. Thus, blocks may be accounted for in the earliest snapshot that references them.

Figure 2:
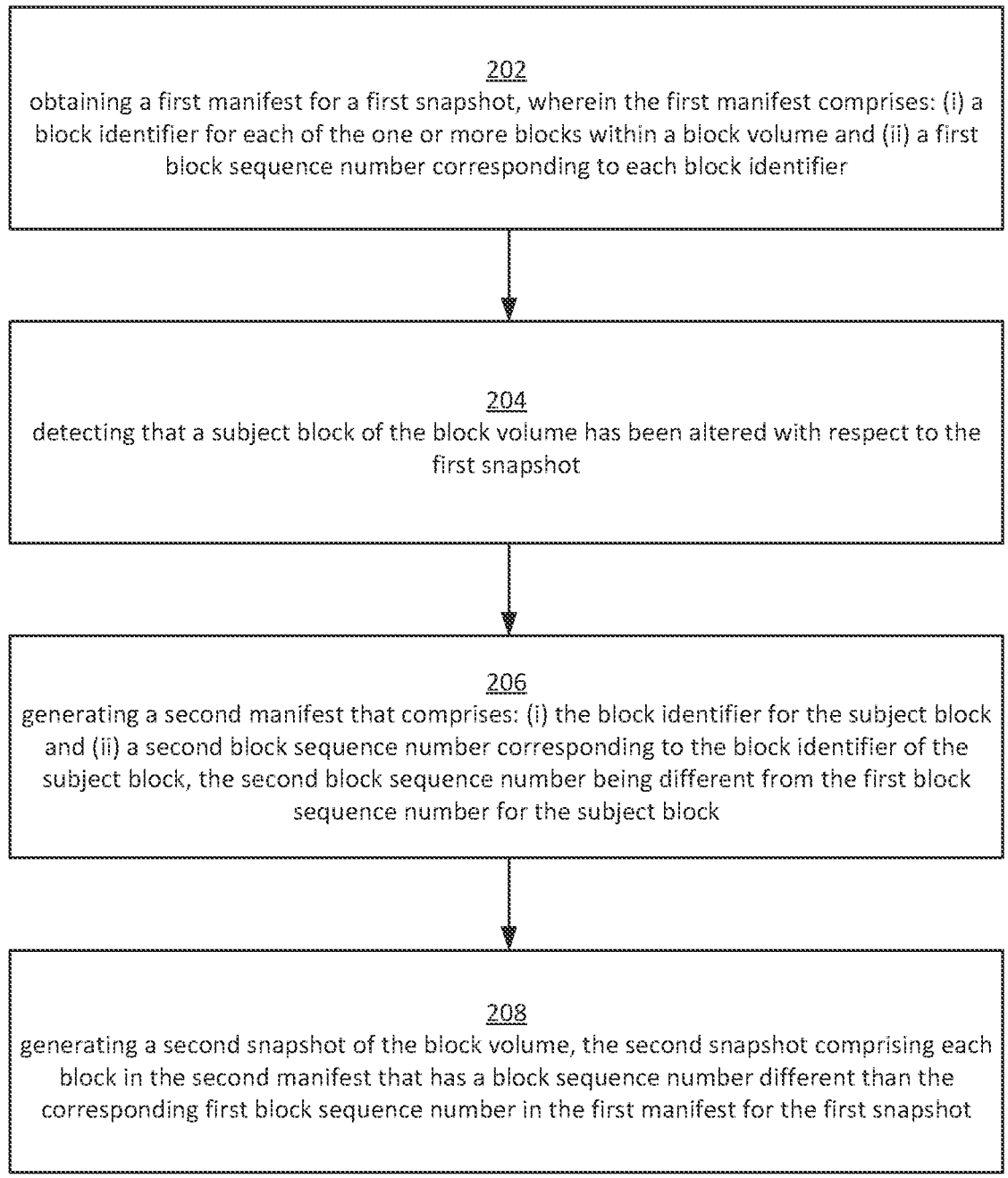
FIG. 2 is a simplified flow diagram for generating an incremental snapshot, according to an example embodiment.

FIG. 2 is a simplified flow diagram for generating an incremental snapshot, according to an example embodiment. In certain embodiments, the process depicted in the flow diagram, or a portion thereof, may be carried out by a computing system (e.g., the system shown in FIG. 5).

At 202, a first manifest for a first snapshot may be obtained. The first manifest may be obtained by generating the first manifest (e.g., based on blocks in a block volume) and/or acquiring the first manifest from memory. The first manifest may have been used to generate a full snapshot or an incremental snapshot. The first manifest may be used to keep track of any number (e.g., zero or more) of blocks. Thus, the manifest may have any number of block identifiers and associated block sequence numbers. The first manifest may have been generated due to an event occurring, a time period passing, user input being received, etc. The first manifest may include at least: (i) a block identifier for each of the one or more blocks in a block volume represented by the first manifest and (ii) a first block sequence number corresponding to each block identifier.

At 204, it may be detected that a subject block of the block volume has been altered with respect to the first snapshot. In other words, the subject block at the second time may include different information than the subject block included at the first time and is therefore considered to be altered.

At 206, a second manifest may be generated. The second manifest may include the block identifier for the subject block. The block identifier for the subject block in the second manifest may be the same block identifier (e.g., have the same block identifier value) for the subject block in the first manifest. Further, the second manifest may include a second block sequence number associated with the block identifier of the subject block. The second block sequence number may be different than the first block sequence number for the subject block. The first block sequence number and second block sequence number may each have a null value, a numerical value, a hash value, an alphabetical value, an alphanumerical value, no value, etc.

The second manifest may be generated by using the first manifest as a starting point and then altering any number of values (e.g., block sequence numbers, block identifiers) of the first manifest to generate the second manifest. Additionally, or alternatively, the second manifest may be generated using at least a portion of the block volume that the manifest is being generated to represent (e.g., by determining which blocks are included in the block volume).

At 208, a second snapshot of the block volume is generated. The second snapshot may be an incremental snapshot and include each block in the second manifest that has a block sequence number different than the corresponding first block sequence number in the first manifest for the first snapshot. The first block sequence number may be said to correspond to the second block sequence number if the block sequence number is associated with the same block identifier.

In an embodiment, the first snapshot and/or second snapshot may be backed up into object storage (e.g., redundantly). Additionally, or alternatively, the first snapshot and/or second snapshot may be stored locally or remotely to the system that generated the snapshot and/or the system that stores the block volume represented by the snapshot.

II. Restoring Using an Incremental Backup

Figure 3A:
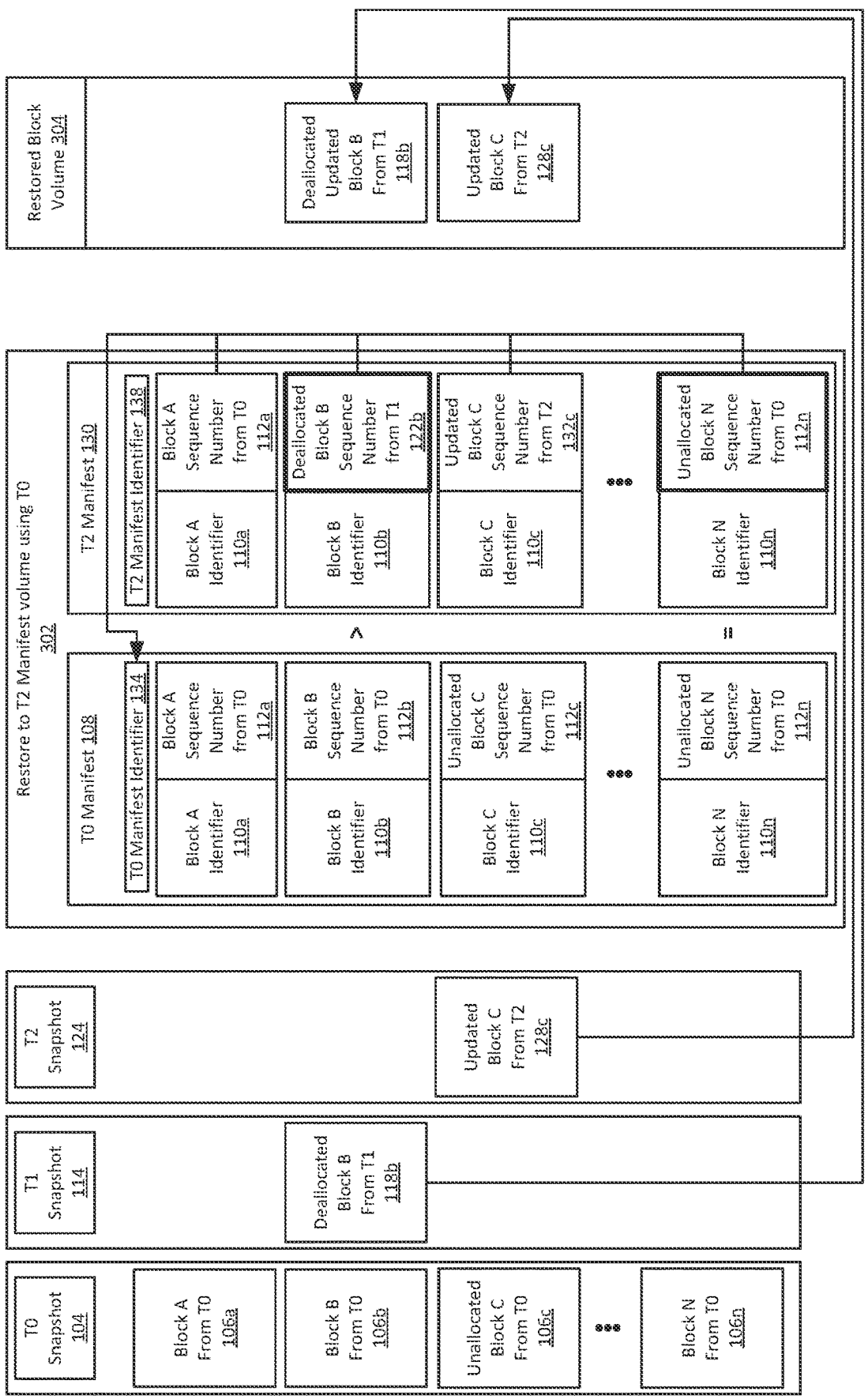
FIG. 3A is a simplified block diagram of restoring a block volume using snapshots, according to an example embodiment.
Figure 3B:
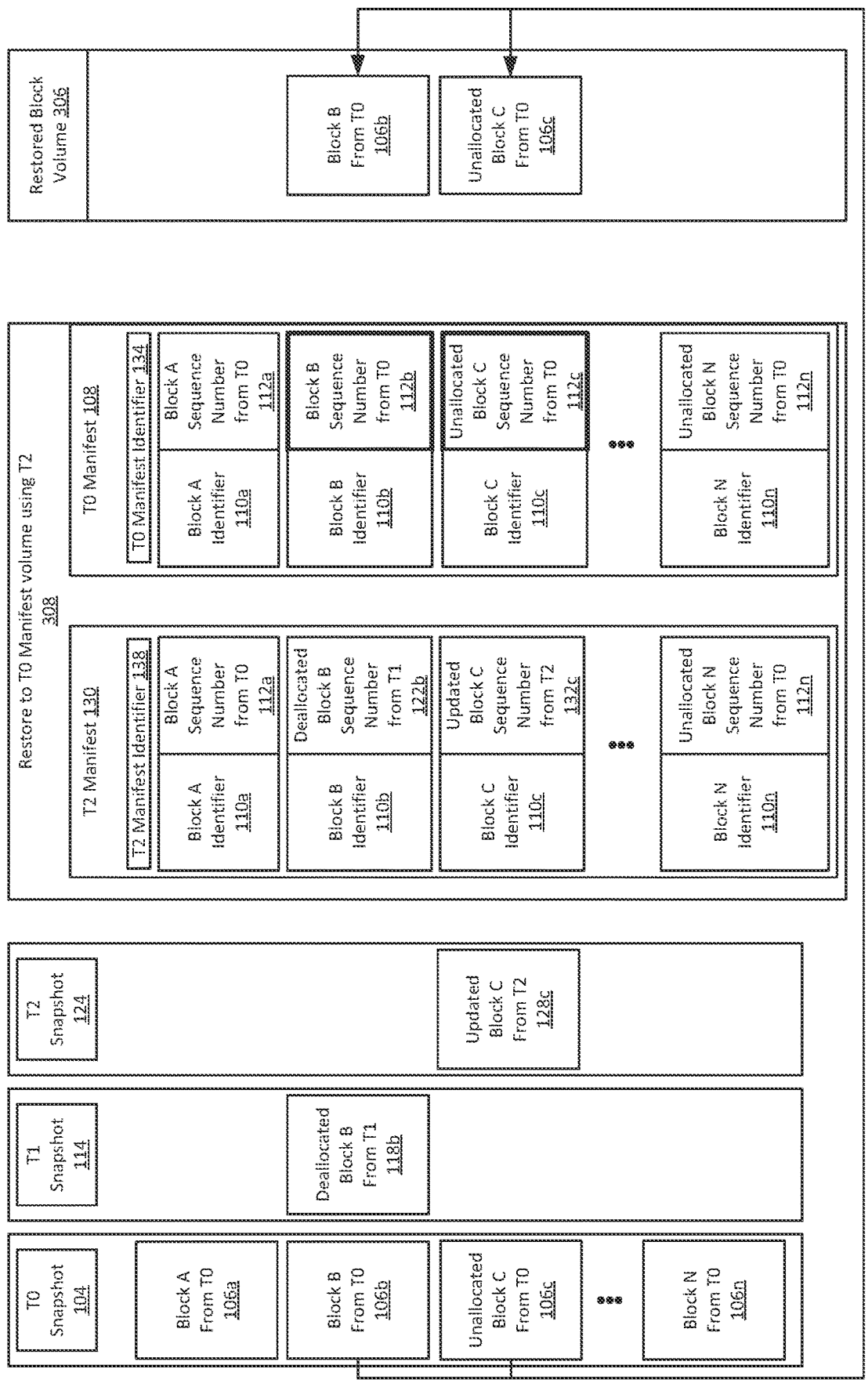
FIG. 3B is a simplified block diagram of restoring a block volume using snapshots, according to an example embodiment.

FIGS. 3A-3B are simplified block diagrams of restoring a block volume using snapshots, according to an example embodiment.

A restored block volume 304 may be created from any incremental or full volume snapshot. Both snapshot types may enable restoration of the full volume contents to the point-in-time snapshot of the volume when the snapshot was taken. In an embodiment, the initial full snapshot is not retained, but a restore is still possible. In an embodiment, incremental snapshots in the snapshot chain may be deleted, but a restore is still possible. Thus embodiments, may allow for the capability of avoiding restoring all snapshots in sequence and instead may be capable of restoring a block volume using only specific snapshots.

For purposes of explanation, a T0 snapshot 104, T1 snapshot 116, and T2 snapshot 124 may be the snapshots generated as discussed with respect to FIG. 1.

For example, the T0 snapshot 104 may be a full snapshot obtained by doing an incremental snapshot (e.g., because it was the first incremental snapshot generated for the block volume that included block A 134, block B 136, unallocated block C 138, through block N 140). Thus, the T0 snapshot 104 may include block A from T0 106a, block B from T0 106b, unallocated block C from T0, 106c, through block N from T0 106n. The T1 snapshot 116 may be an incremental snapshot with deallocated block B from T1 118b (e.g., because block B 136 from the block volume was the only block that was altered between generation of a T0 manifest 108 and a T1 manifest 120). The T2 snapshot 124 may be an incremental snapshot with updated block C from T2 128c (e.g., because block C from the block volume was the only block that was altered between generation of the T1 manifest 120 and a T2 manifest 130).

At some time after the T0 snapshot 104, T1 snapshot 116, and T2 snapshot 124 are generated, a block volume restore may be initiated using a first snapshot and a second snapshot. The first snapshot and second snapshot for use in the restore process of the restored block volume 304 may be identified by at least a user or process. The first and second snapshot may also be identified using a manifest associated with the snapshots, and the manifests may be identified by at least a user or process. For example, a user may identify a snapshot to use in a restore or may identify a manifest to use in the restore, where the manifest is thereby able to identify the snapshot and vice-versa (e.g., because the snapshot was generated from a corresponding manifest).

The first snapshot may be older (e.g., created before) the second manifest. In certain embodiments, the first snapshot is the last created snapshot before the second snapshot, but need not be.

When creating a restored block volume from a snapshot, a parent snapshot may be identified (e.g., by a user, by a process) as either the first snapshot or the second snapshot. The parent snapshot may be a snapshot generated at a time before a child snapshot. A parent manifest may be a manifest generated at a time before a child manifest.

When creating a restored block volume 304 from a snapshot, the parent manifest (e.g., T0 manifest 108) or the child manifest (e.g., T2 manifest 130) may be representative of the block volume to be restored. Thus, a child snapshot or a parent snapshot may be used as a starting point to restore the parent snapshot or child snapshot, respectively. In other words, a child block volume may have the block volume restored with the restored block volume 304 to match the block volume of the parent block volume (e.g., FIG. 3A). Further, a parent block volume may have the block volume restored with the restored block volume 304 to match the block volume of the child block volume (e.g., FIG. 3B).

In certain embodiments, block sequence numbers of the child manifest are compared with manifest identifier (e.g., parent snapshot sequence number, parent manifest sequence number) to determine whether the respective block sequence number of the child manifest is less than or equal to the identifier of the parent manifest. Depending on the comparison result, the block corresponding to the block identifier associated with the block sequence number in the child manifest or parent manifest may be indicated for use in a restored block volume. The block may be included in a snapshot referred to by the block sequence number in the child manifest associated with the block identifier or may be included in a snapshot referred to by the block sequence number in the parent manifest associated with the block identifier.

In certain embodiments, one or more block sequence numbers of the child manifest are compared with one or more block sequence numbers in the parent manifest that are associated with the same block identifiers in each of the parent and child manifests. For example, the block sequence numbers may need to be compared if the block sequence numbers do not represent which time (e.g., which manifest) an alteration to the block corresponding to the block identifier associated with the block sequence number in the child manifest took place. For example, a sequence number of zero may not be representative of when the block sequence number was changed if block sequence numbers start at non-zero numbers and increment when alterations to blocks occur. For example, a null sequence number may not be representative of when the block sequence number was changed if block sequence numbers start at non-null values and change non-null values when alterations to blocks occur. Depending on the block sequence number to block sequence number comparison result, and/or depending on the child block sequence number, the block corresponding to the block identifier associated with the block sequence number in the child manifest or parent manifest may be indicated for use in a restored block volume. The block may be included in a snapshot referred to by the block sequence number in the child manifest associated with the block identifier or may be included in a snapshot referred to by the block sequence number in the parent manifest associated with the block identifier.

The restore process may be capable of restoring the block volume that has changed between the first snapshot and the second snapshot. In other words, the restore process may be capable of restoring the block volume that has been altered between the parent snapshot and the child snapshot. Thus, the restore process may be capable of restoring the block volume that has been altered between the parent manifest and the child manifest.

In certain embodiments, one, some, or all block sequence numbers associated with each block identifier are iterated through for the parent manifest and the child manifest to determine which block sequence number identifies the most recently altered block included in a snapshot. For example, each respective block sequence number corresponding to a respective block identifier in the parent manifest may be compared to a respective block sequence number corresponding to a respective block identifier in child manifest to determine which block sequence number identifies the most recently altered (e.g., allocated, deallocated) block.

In certain embodiments, the block sequence number for the block identified in the child T2 manifest 130 may be used to determine whether the identified corresponding block has been altered since the parent T0 manifest 108 was generated. Each block sequence number in the child manifest may be compared against the manifest identifier of the parent manifest and/or parent snapshot to determine if the block sequence number in the child manifest corresponds to a block that was altered after the parent manifest and/or snapshot was generated.

If the block volume represented by the child manifest is being restored (e.g., FIG. 3A) and the block sequence number in the child manifest indicates (e.g., by the block sequence number in the child manifest being larger than a manifest identifier of the parent manifest) a corresponding block was altered since the parent manifest was generated, the block corresponding to the block identifier associated with the block sequence number of the child manifest in the snapshot corresponding to the child manifest may be used to generate the restored block volume. In certain embodiments, to determine if a block was updated, the block sequence numbers in the child manifest and the parent manifest associated with the same block identifier in each respective manifest may be compared (e.g., when a block has been deallocated or remains unallocated).

If the block volume represented by the parent manifest is being restored (e.g., FIG. 3B) and the block sequence number in the child manifest indicates (e.g., by the block sequence number in the child manifest being larger than a manifest identifier of the parent manifest) a corresponding block was altered since the parent manifest was generated, the block corresponding to the block identifier associated with the block sequence number of the parent manifest in the snapshot corresponding to the parent manifest may be used to generate the restored block volume. In certain embodiments, to determine if a block was updated, the block sequence numbers in the child manifest and the parent manifest associated with the same block identifier in each respective manifest may be compared (e.g., when a block has been deallocated or remains unallocated).

Determining if a block has been altered since the parent manifest was generated may be accomplished based on the scheme used to update the block sequence numbers when it is determined that a block has been altered and that alteration is then reflected in a snapshot (e.g., the child snapshot or a snapshot made between the parent snapshot and the child snapshot). Thus, in certain embodiments, the determination may be made by comparing the block sequence number associated with the block identifier of the parent manifest corresponding to the block sequence number associated with the corresponding block identifier of the child manifest to determine which block sequence number is higher, lower, longer, shorter, etc., depending on the scheme used to update the block sequence numbers when it is determined that a block has been altered. In certain embodiments, the determination may be made by comparing the block sequence number associated with the block identifier of the child manifest to the manifest identifier of the parent manifest.

For example, in an embodiment where the block sequence number is incremented each time the block corresponding to the block identifier associated with the block sequence number, a determination may be made for any number of block identifiers in the child manifest as to whether the block sequence number in the parent manifest is equal to or lower than the child manifest. If a block sequence number in the parent manifest is the same value as the corresponding block sequence number in the child manifest, then it could mean that the block corresponding to the block identifier associated with the block sequence numbers has not been altered since the parent snapshot and/or parent manifest was generated, or has not been altered with respect to the parent manifest and/or parent snapshot. For example, the block A sequence number from T0 112a in the T2 manifest 130 may be compared to a T0 manifest identifier 134 of the T0 manifest 108 and/or an identifier of the T0 snapshot to determine if the block A sequence number from T0 112a in the T2 manifest 130 was generated after the T0 manifest 108 and/or the T0 snapshot. In certain embodiments, if the block A sequence number from T0 112a in the T2 manifest 130 is equal to the identifier for the T0 manifest, then the block A identifier 110a associated with the block A sequence number from T0 is known to have not been altered relative to the T0 manifest. As a result, block A from T0 may not be included in the restored block volume.

For the same example, on the other hand, if the block sequence number in the parent manifest is a lower value than the block sequence number in the child manifest, then it would mean that the block corresponding to the block identifier associated with the block sequence numbers had been altered (e.g., updated, deallocated, allocated) since the parent manifest and/or parent snapshot were generated.

In certain embodiments, when a block is unallocated or deallocated, the block sequence number is set to a predetermined value and may not represent in which snapshot the alteration is reflected. In certain embodiments, when a block is unallocated or deallocated, the block sequence number is set to a predetermined value and a flag in the manifest is set to indicate which snapshot the alterations is reflected even though the block sequence number may not represent the time of alteration to the block. In certain embodiments, when the block sequence number does not independently indicate which snapshot the alterations is reflected in, a comparison between the respective block sequence numbers in the parent snapshot and the child snapshot may be performed to determine if the respective snapshot corresponding to the parent manifest or child manifest should be used to restore a block and include in the restored block volume.

FIG. 3A illustrates an embodiment, where a first snapshot (e.g., T0 snapshot 104, "parent snapshot") and a second snapshot (e.g., T2 snapshot 124, "child snapshot") are identified for use when creating a restored block volume 304. Specifically, it is illustrated that the block volume represented by the T2 manifest 130 may be used with the T0 manifest 108 to restore a block volume to the state represented by the T2 manifest 130.

In an embodiment, the restored block volume 304 may include at least the blocks that have changed since the earliest generated snapshot (e.g., T0 snapshot 104) of the block volume and the second snapshot of the block volume (e.g., T2 snapshot 124). For example, the restored block volume 304 may include deallocated block B from T1 118b and updated block C from T2 128c because block B 136 and unallocated block C 138 had been altered (e.g., deallocated, updated) between time T0 and time T2. In certain embodiments, the restored block volume 304 may include additional blocks, such as any number of blocks that have not been altered between the time snapshot T0 and snapshot T2 were generated (e.g., block A 134).

The illustration in FIG. 3A shows how blocks to include in the restored block volume 304 and/or list may be selected using the parent snapshot (e.g., T0 snapshot 104) and the child snapshot (e.g., T2 snapshot 124). Thus, a restore may use the parent manifest (e.g., T0 manifest 108) and the child manifest (e.g., T2 manifest 130), as shown by 302.

In some embodiments, it may be determined during which snapshot after the parent snapshot the most recent change to the block was recorded. In some embodiments, the determination may be made using the block sequence number associated with the child manifest. The block sequence number may represent the snapshot and/or manifest of a time at which the block was included in a snapshot for.

Using the illustration as an example, in certain embodiments, if the T0 manifest 108 is used as a parent manifest and compared with the T2 manifest 130 as a child manifest, each, or some of, the block sequence numbers associated with the block identifiers that are corresponding between the T2 manifest 130 and the T0 manifest 108 may be compared to determine for respective block identifiers, which block sequence number has most recently been altered. According to the process used when updating block sequence numbers based on blocks being altered, the comparison conditions will vary. For example, some embodiments may determine whether the block sequence number associated with the block A identifier in the T2 manifest 130 is greater than, less than, longer than, or shorter than the block A sequence number from T0 112a associated with the block A identifier in the T0 manifest 108. Based on the determination of which block sequence number is the most recently altered and the block volume (e.g., a block volume represented by the child manifest, a block volume represented by a parent manifest) being restored, the block identified by the block identifier and the snapshot of the block associated with the determined block sequence number in the parent manifest or child manifest may be used to create at least a portion of a restored block volume 304.

In FIG. 3A, the block A sequence number from T0 112a associated with the block A identifier 110a in the T2 manifest 130 may be compared with an T0 manifest identifier 134 and the comparison may indicate that the Block A corresponding to the block A identifier 110a in the T2 manifest 130 and in the T1 manifest 108 has not changed between T0 and T2. Thus, it may be determined that the block corresponding to the block A identifier 110a has not been altered between T0 and T2. As a result, in some embodiments, no block corresponding to the block A identifier 110a will be included in the restored block volume 304.

Further, the block sequence number associated with the block B identifier 110b in the T2 manifest 130 may be compared with the T0 manifest identifier 134 for the T0 manifest 108 and the comparison may indicate that the deallocated block B sequence number from T1 122b may have changed (e.g., has a smaller sequence number) since the T0 manifest 108 was generated. The comparison may determine whether the deallocated block B sequence number from T1 122*b* in the T2 manifest 130 was generated after the T0 manifest 108 and/or the T0 snapshot. The deallocated block B sequence number from T1 122*b* may be compared with the block B sequence number from T0 112*b* to determine if the block B corresponding to the block B identifier 110*b* was deallocated at T0 or if the block B has since been deallocated between T0 and T1. In certain embodiments, if the deallocated block B sequence number from T1 122*b* in the T2 manifest 130 is less than (e.g., equal to zero) the T0 manifest identifier 134 for the T0 manifest, then the block B corresponding with the block B identifier 110*b* associated with the block B sequence number from T0 is known to have been altered after the T0 manifest was generated. As a result, since the block B was deallocated at T1 and the block volume represented by the T2 manifest 130 is being restored, the restored block volume 304, may include the deallocated block B by using the snapshot that corresponds to the deallocated block B sequence number from T1, the T1 snapshot (e.g., if the child manifest is representative of the block volume to be restored).

In certain embodiments, predetermined data is written for deallocated block. In certain embodiments, the deallocated block B from T1 in the T1 snapshot 114 is used in generating the restored block volume. The deallocated block B sequence number from T1 122*b* may indicate which snapshot the block volume for block B is included in for the block volume represented by the T2 manifest 130. In certain embodiments where the deallocated block B sequence number from T1 122*b* is determined to correspond to a deallocated block, the deallocated block B from T1 is not included in the restored block volume. In certain embodiments where the deallocated block B sequence number from T1 122*b* is determined to correspond to a deallocated block, data representing a deallocated block is included in the restored block volume 304). In certain embodiments, when the block to be restored is a unallocated or deallocated block, the block may not be included in the restored block volume 304.

Furthermore, the block sequence number associated with the block C identifier 110*c* in the T2 manifest 130 may be compared with the T0 manifest identifier 134. The comparison may indicate that the Block C corresponding to the block C identifier 110*c* in the T2 manifest 130 has been altered since the T0 manifest 108 was generated. In certain embodiments, if the block C sequence number from T2 132*c* in the T2 manifest 130 is greater than the T0 manifest identifier 134 for the T0 manifest 108, then the block C identifier 110*c* associated with the block C sequence number from T0 is known to be altered after the T0 manifest. Thus, it may be determined that the block corresponding to the block C identifier 110*c* has been altered between T0 and T2. As a result, since the example is using the child manifest (T2 manifest 130) as the manifest representing the block volume to be restored, the updated block C from T2 128*c* in the T2 snapshot 124 may be included in the restored block volume 304 because the updated block C sequence number from T2 is associated with the block C identifier 110*c* and the updated block C sequence number was updated in the T2 manifest 130, and the T2 manifest 130 corresponds to the T2 snapshot 124.

Additionally, in the illustrated example, the unallocated block N sequence number from T0 112*n* associated with the block N identifier 110*n* in the T2 manifest 130 may be compared with the with the T0 manifest identifier 134. In certain embodiments, the unallocated block N sequence number from T0 112*n* in the T2 manifest 130 is not compared with the T0 manifest identifier 134 because the unallocated block N sequence number from T0 112*n* in the T2 manifest 130 is null or zero and therefore it is known that a comparison may need to be done between the block sequence number associated with the block N identifier 110*n* in the T0 manifest and the block sequence number associated with the block N identifier 110*n* in the T2 manifest 130. In the example, the block sequence number associated with the block N identifier 110*n* may be the same in the T0 manifest 108 and the T2 manifest 130 and therefore, a determination may be made that the block N will not be included in the restored block volume 304.

FIG. 3B illustrates an embodiment, where a first snapshot (e.g., T0 snapshot 104, "parent snapshot") and a second snapshot (e.g., T2 snapshot 124, "child snapshot") are identified for use when creating a restored block volume 304. Specifically, it is illustrated that the block volume represented by the T0 manifest 108 may be used with the T2 manifest 130 to restore a block volume to the state represented by the T0 manifest 108.

In an embodiment, the restored block volume 304 may include at least the block volume represented by the parent manifest that is not included in the block volume represented by the child manifest (e.g., revert, via the restored block volume 306, the blocks that have changed between the block volume represented by the T0 manifest and the T2 manifest to the respective blocks that were represented in the T0 snapshot corresponding to the T0 manifest). For example, the restored block volume 306 may include block B from T0 106*b* and unallocated block C from T0 106*c*. In certain embodiments, unallocated or deallocated blocks are not included in the restored block volume and/or are not read from a snapshot.

The illustration in FIG. 3B shows how blocks to include in the restored block volume 306 may be selected using the parent snapshot (e.g., T0 snapshot 104) and the child snapshot (e.g., T2 snapshot 124). Thus, a restore may use the parent manifest (e.g., T0 manifest 108) and the child manifest (e.g., T2 manifest 130), as shown by 308.

For example, a block sequence number in the T2 manifest 130 (child manifest) may be compared to the T0 manifest identifier 134 of the T0 manifest 108 (parent manifest) and/or an identifier of the T0 snapshot to determine if the block sequence number in the T2 manifest 130 was generated after the T0 manifest 108 and/or the T0 snapshot. In certain embodiments, if the block sequence number in the T2 manifest 130 is less than (e.g., equal to zero) the T0 manifest identifier 134 for the T0 manifest, then the block corresponding with the block identifier associated with the block sequence number from T0 is known to have been updated after the T0 manifest was generated. As a result, the block from T0 may be included in the restored block volume by using the snapshot that corresponds to the block sequence number from T0, the T0 snapshot (e.g., if the parent manifest is representative of the block volume to be restored). In certain embodiments where the block sequence number from is determined to correspond to a deallocated block, the deallocated block is not included in the restored block volume 306. In certain embodiments where the deallocated block sequence number is determined to correspond to a deallocated block, data representing a deallocated block is included in the restored block volume 306).

In certain embodiments, the deallocated or unallocated block sequence number of a child manifest associated with a block identifier that corresponds to a block is compared with the block sequence number associated with the block identifier for same block of the block volume of the parent manifest to determine if the block was also deallocated in the parent manifest. For example, unallocated block N sequence number from T0 112*n* may have been set to zero or null in the child T2 manifest 130 and in parent T0 manifest 108. In certain embodiments, where the deallocated or unallocated block was deallocated or unallocated in each of the parent manifest and the child manifest, the block may not be included in the restored block volume.

As another example, the updated block C sequence number from T2 132*c* may be compared to the T0 manifest identifier of the T0 manifest 108 and/or an identifier of the T0 snapshot to determine if the block C sequence number from T2 132*c* in the T2 manifest 130 was generated after the T0 manifest 108 and/or the T0 snapshot. In certain embodiments, if the block C sequence number from T2 132*c* in the T2 manifest 130 is greater than the T0 manifest identifier 134 for the T0 manifest 108, then the block C identifier 110*c* associated with the block C sequence number from T0 is known to be updated after the T0 manifest. As a result, if the block volume represented by the parent manifest is being restored, unallocated block C from T0 may be included in the restored block volume 306 by using the snapshot that corresponds to the unallocated block C sequence number from T0 106*c*, the T0 snapshot.

Walking through the illustrated example further, the block A sequence number from T0 112*a* associated with the block A identifier 110*a* in the T2 manifest 130 may be compared with an T0 manifest identifier 134 and the comparison may indicate that the Block A corresponding to the block A identifier 110*a* in the T2 manifest 130 and in the T1 manifest 108 has not changed between T0 and T2. Thus, it may be determined that the block corresponding to the block A identifier 110*a* has not been altered between T0 and T2. As a result, in some embodiments, no block corresponding to the block A identifier 110*a* may be included in the restored block volume 306.

Further, the block sequence number associated with the block B identifier 110*b* in the T2 manifest 130 may be compared with the T0 manifest identifier 134 for the T0 manifest 108 and the comparison may indicate that the deallocated block B sequence number from T1 122*b* may have changed (e.g., has a smaller sequence number, has a higher sequence number) since the T0 manifest 108 was generated. Determining that the block sequence number has changed and if the sequence number is indicative of when the change occurred, may result in using the block in the snapshot (e.g., the block B from T0 106 in the T0 snapshot 104) associated with the parent manifest in the restored block volume 306. Determining that the block sequence number has changed and if the sequence number is not indicative of when the change occurred, may result in the deallocated block B sequence number from T1 122*b* to be compared with the block B sequence number from T0 112*b* to determine if the block B corresponding to the block B identifier 110*b* was deallocated at T0 or if the block B has since been deallocated between T0 and T1. In the example, since the block B was deallocated at T1 and the block volume represented by the T0 manifest 108 is being restored, the restored block volume 306 may include block B from T0 106*b* from the T0 snapshot 104.

Furthermore, the block sequence number associated with the block C identifier 110*c* in the T2 manifest 130 may be compared with the with the T0 manifest identifier 134. The comparison may indicate that the Block C corresponding to the block C identifier 110*c* in the T2 manifest 130 has been altered since the T0 manifest 108 was generated. Thus, it may be determined that the block corresponding to the block C identifier 110*c* has been altered between T0 and T2. As a result, since the example is using the parent manifest (the T0 manifest 108) as the manifest representing the block volume to be restored, the unallocated block C from T0 106*c* in the T0 snapshot 104 may be included in the restored block volume 306 because the updated block C sequence number from T2 is associated with the block C identifier 110*c* and the updated block C sequence number was updated in the T2 manifest 130, and the T2 manifest 130 corresponds to the T2 snapshot 124. In certain embodiments, predetermined data is written for an unallocated block. In certain embodiments, the unallocated block C from T0 106*c* in the T0 snapshot 104 is used in generating the restored block volume 306. The unallocated block C sequence number from T0 112*c* may indicate which snapshot the block volume for block C is included in for the block volume represented by the T0 manifest 108.

Additionally, in the illustrated example, the unallocated block N sequence number from T0 112*n* associated with the block N identifier 110*n* in the T2 manifest 130 may be compared with the with the T0 manifest identifier 134. In certain embodiments, the unallocated block N sequence number from T0 112*n* in the T2 manifest 130 is not compared with the T0 manifest identifier 134 because the unallocated block N sequence number from T0 112*n* in the T2 manifest 130 is null or zero and therefore it is known that a comparison may need to be done between the block sequence number associated with the block N identifier 110*n* in the T0 manifest and the block sequence number associated with the block N identifier 110*n* in the T2 manifest 130. In the example, the block sequence number associated with the block N identifier 110*n* may be the same in the T0 manifest 108 and the T2 manifest 130 and therefore, a determination may be made that the block N will not be included in the restored block volume 304.

The restored block volume 306 and/or information about the restored block volume 306 may be useful to a user. A user may be enabled to list the blocks in the restored block volume 306 (e.g., the modified blocks) using a standard block device interface (e.g., using small computer system interface's (SCSI's) get logical block addressing (LBA) status command). LBA may be a linear addressing scheme to specify locations of data blocks in storage. The specified locations may enable finding block or pieces of data included in certain blocks. In LBA, blocks may be linearly addressed such that data blocks are located by an integer index. For example, a first block may be addressed as LBA 0 and a second block may be addressed as LBA 1, and so on. The user, via user interface and block device interface, may cause information about the restored block volume 306 to be obtained. The user interface may be used to present information about the restored block volume 306 to the user.

For example, the user may use the user interface and/or block device interface to execute a sg_get_lba_status command to receive information about the restored block volume 306 in non-volatile memory (NVM). The block device interface may be a NVM Express (NVMe) interface. The block device interface may be a NVM Host Controller interface. The get LBA status command may enable users to list a set of blocks (e.g., zero or more blocks) in mapped or deallocated states directly from the block volume attachment they also use to read the blocks. The get LBA status command may include a starting logical block address, a report type, and an optional maximum scan length. The get LBA status command may return LBA status descriptors, which may describe an LBA range (e.g., 1 gigabyte worth of logical blocks) and the provisioning status of that range. The descriptors may be returned in ascending order of LBA (e.g., effectively acting as a run-length encoding). The report type filters may be included in the response. LBAs returned as mapped (e.g., provisioning status equal to 3) may be blocks that were written after the parent snapshot (e.g., the T0 snapshot 104). LBAs returned as deallocated (e.g., provisioning status equal to 1) may be blocks that were mapped in the parent snapshot and then deallocated after.

The same block device interface used to access the T0 snapshot 104 may be used to access the restored block volume 306. The block device interface may be configured to list the blocks in the restored block volume 306 and the list may be presented using the user interface. Presentation of the list using a user interface may enable the user of the user interface to determine which blocks are included in the restored block volume 306.

Figure 4:
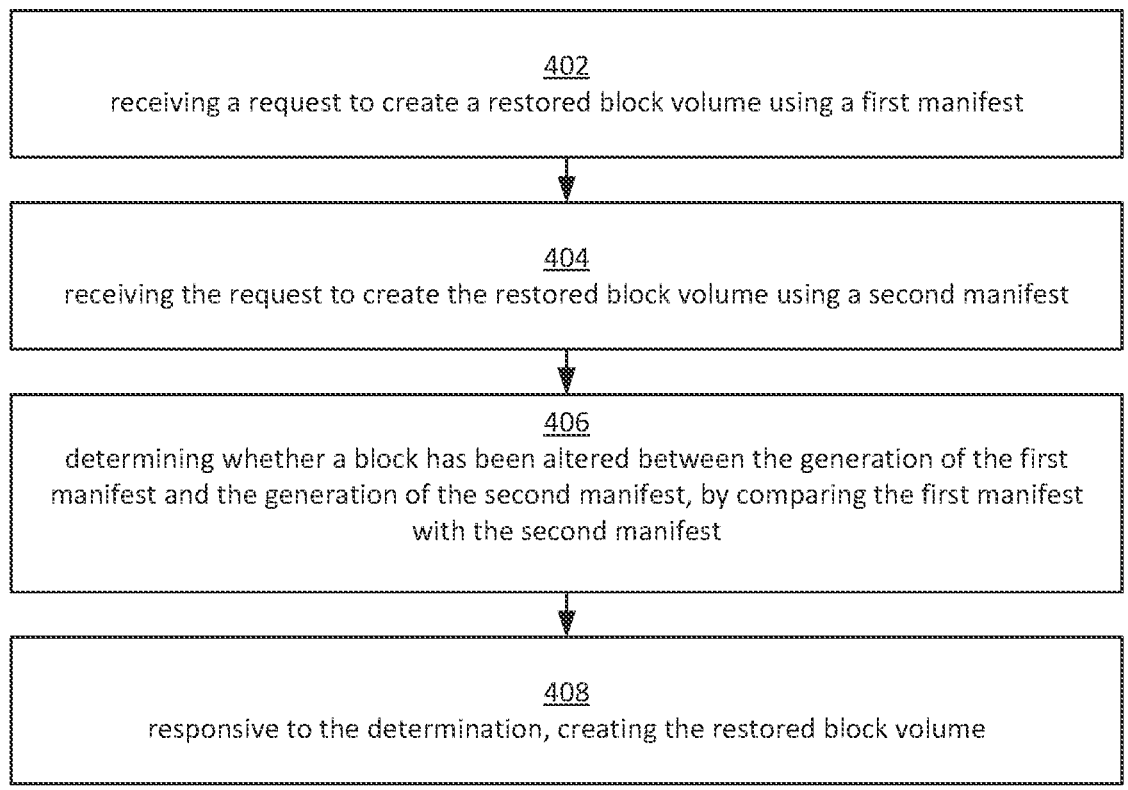
FIG. 4 is a simplified flow diagram for restoring using snapshots, according to an example embodiment.

FIG. 4 is a simplified flow diagram for restoring at using snapshots, according to an example embodiment. In certain embodiments, the process depicted in the flow diagram, or a portion thereof, may be carried out by a computing system (e.g., the system shown in FIG. 5).

At 402, a request to create a restored block volume using a first manifest may be received. The request may indicate that the first manifest is to be used by way of an identifier associated with the first manifest (e.g., manifest identifier, snapshot identifier). In some embodiments, the indication may be made based on the first manifest being associated with a first snapshot and the first snapshot having been indicated in the request. The snapshot may also be indicated using an identifier. An identifier for a manifest and/or a snapshot may be unique to a block volume represented by the first block volume state and the second block volume state. In some embodiments, an identifier for a manifest and/or snapshot may be unique to a snapshot system that manages one or more block volumes.

In some embodiments, the request may be received from a user (e.g., a user of a block volume restore system). For example, a user may signal that a first manifest should be used as a parent manifest for creating the restored block volume. In certain embodiments, the indication is received from a system (e.g., a block volume restore system). For example, a system may be configured to create the restored block volume upon a condition occurring and may indicate that the first snapshot should be used as a parent snapshot and therefore implicitly indicate that the associated first manifest should be used as the parent manifest in a block volume restore process. The first manifest may comprise a block identifier for a block, a first block sequence number corresponding to the block identifier and associated with a first snapshot, and a manifest identifier. The first manifest may have been generated using a prior manifest.

The block identifier may correspond to and be used to identify a block in the first block volume state that is at least partially represented by the first snapshot. Further, each block identifier may be associated with a block sequence number. The block sequence number may be associated with a sequence number of the first manifest or a manifest that was generated before the first manifest. The block identifier may be included in the first manifest and the second manifest. The block identifier may identify the same block of the block volume in the first manifest and the second manifest.

In some embodiments, the block sequence number will be different in the second manifest when an alteration has been detected in relation to the block corresponding to the block identifier associated with the first block sequence number. Thus, a change in the block sequence number from the first manifest (e.g., representing the first block volume state) to the second manifest (e.g., representing the second block volume state) may indicate that the block of the block volume has undergone an alteration. An alteration may include a block being deallocated, updated, and/or allocated. How a block sequence number changes over time (e.g., incrementing when a block corresponding to the block identifier changes) may be dependent on how the block sequence number is configured to change as manifests are generated.

In some embodiments, when the block sequence number has changed from the time the first manifest was generated to the time the second manifest was generated, as indicated by the first manifest and the second manifest sequence numbers for the same block identifier, the block identifier of the manifest is used to obtain the corresponding block from the first snapshot or the second snapshot and use the block in the creation of a restored block volume. The first snapshot and/or the second snapshot may be locally stored or remotely stored.

The block identifier paired with the first block sequence number may be used to reference at least a portion of the block volume at the point in time when the first manifest and/or first snapshot was generated and when the block volume was in a first block volume state. In certain embodiments, the first snapshot is a point-in-time capture of the block of the block volume in the first block volume state. In certain embodiments, the first block sequence number includes a number, character, and/or hash value.

At 404, a request to create the restored block volume using a second manifest may be received. The second manifest may include the block identifier for the block, a second block sequence number corresponding to the block identifier and associated with a second snapshot. The second manifest and the second snapshot may be representative of the block volume in the second block volume state.

The second manifest may have been generated by reading blocks in a memory volume to detect that the block has been altered since the point in time when the first manifest was generated. Generating the second manifest may further include obtaining the first manifest associated with the first snapshot and using the first manifest to generate the second manifest. The second manifest may be generated by using the second block sequence number, the second block sequence number may be generated by changing the first block sequence number included within the first manifest.

The second block sequence number may be higher or lower than the first block sequence number. The second block sequence number may be set to a predetermined value (e.g., zero or a null value). The second block sequence number may be higher or lower may be different that the manifest identifier of the first manifest. The second block sequence number may have a value that indicates the block at the time the second manifest was generated has been altered relative to the point in time when the first manifest was generated. The block sequence number for the block identifier may be associated with a second snapshot. The second snapshot may have been created based on the second block sequence number in the second manifest.

Similar to how the first block identifier within the first snapshot, where the first snapshot is associated with the first manifest, may be used to identify a block of the block volume in the first block volume state represented by the first snapshot, the second block identifier within the second snapshot, where the second snapshot is associated with the second manifest, may be used to identify the corresponding block of the block volume in the second block volume state represented by the second snapshot.

Therefore, 404 may be similar to 402 and similar processes may be carried out at 404. The second manifest may be used as a child manifest and be associated with a child snapshot for creating a restored block volume.

The block identifier paired with the second block sequence number may be used to reference at least a portion of the block volume at a point in time when the second manifest and/or second snapshot was generated and when the block volume was in a second block volume state. In certain embodiments, the second snapshot is a point-in-time capture of the block of the block volume in the second block volume state. In certain embodiments, the second block sequence number includes a number, character, and/or hash value.

At 406, a determination as to whether a block has been altered between the generation of the first manifest and the generation of the second manifest may be made by comparing the first manifest with the second manifest. A block may have been altered if the second block sequence number is indicative of the block having been altered after the first manifest was generated. The altered block may have a different sequence number (e.g., higher sequence number, null sequence number, etc.) than the block with the corresponding matching block identifier in the first manifest. The second block sequence number may indicate that the second block sequence number was generated after the first block sequence number. In certain embodiments, a comparison between the second block sequence number and the first block sequence number takes place to determine whether the block associated with the corresponding block identifier has been altered between the generation of the first manifest and the second manifest.

In certain embodiments, the determination may further comprise comparing the second block sequence number to the manifest identifier of the first manifest and determining whether the second block sequence number was changed after the first manifest was generated. For example, the second block sequence number may be different than the manifest sequence number, or otherwise indicate that the block has changed since the generation of the first manifest. Determining whether the second block sequence number was changed after the first manifest was generated may indicate that the second snapshot associated with the block identifier includes a more recent write operation to the block corresponding to the block identifier than the same block in the first snapshot.

At 408, responsive to the determination at 406, the restored block volume may be created. The restored block volume may be created with the first snapshot and/or the second snapshot. In certain embodiments, creating the restored block volume includes creating the restored block volume with a first portion of the first snapshot and/or a second portion of the second snapshot.

In certain embodiments, the created restored block volume is an empty block volume. The empty block volume may include an empty block being written or no block being written to a restored block volume.

In an embodiment, blocks in the restored block volume may include zero or more blocks from the first snapshot and/or may include zero or more blocks from the second snapshot.

Figure 5:
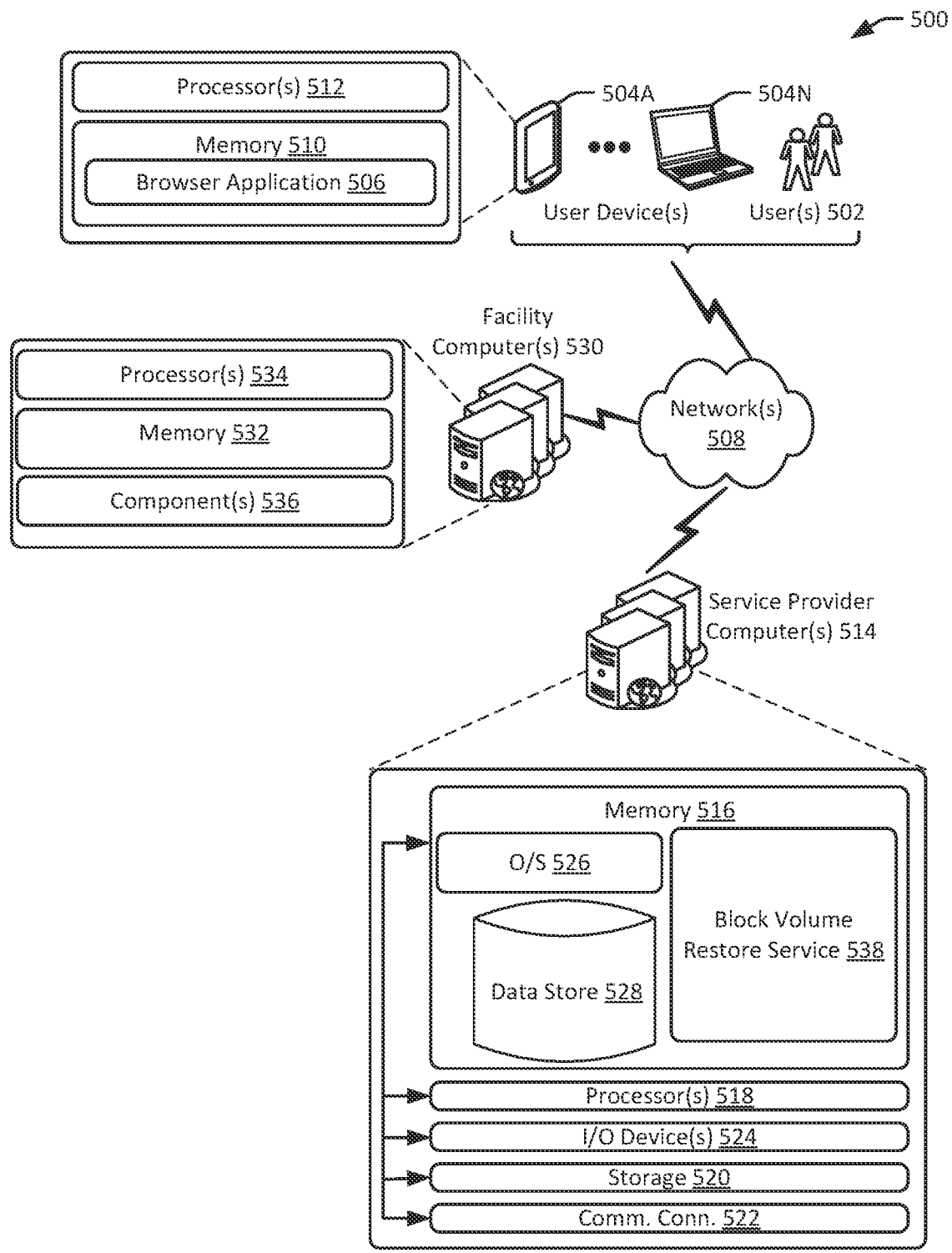
FIG. 5 illustrates an example architecture for an incremental snapshot service that includes one or more service provider computers, a user device, and one or more facility computers in accordance with at least one embodiment.

FIG. 5 illustrates an example architecture for an incremental snapshot service that includes one or more service provider computers, a user device, and one or more facility computers in accordance with at least one embodiment.

In the architecture 500, one or more users 502 who desire to create a snapshot may utilize user computing devices 504A-N (collectively, user devices 504) to access a browser application 506 or a user interface (UI) that can be accessed through the browser application 506 and via one or more networks 508, to receive text data, image data, video data, or the like, which may be presented and interacted with via browser application 506 or the UI accessible through the browser application 506. The "browser application" 506 can be or include any browser control or native application that can access and/or display a network page or other information. A native application may include an application or program that has been developed for use on a particular platform, such as an operating system, or a particular device such as a particular type of mobile device.

In accordance with at least one embodiment, the user devices 504 may be configured for communicating with service provider computers 514 and facility computers 530 via networks 508. The user devices 504 may include at least one memory, such as memory 510, and one or more processing units or one or more processors 512. The memory 510 may store program instructions that are loadable and executable on the one or more processors 512, as well as data generated during the execution of these programs. Depending on the configuration and type of the user devices 504, the memory 510 may be volatile, such as random access memory (RAM), and/or non-volatile such as read-only memory (ROM), flash memory, etc. The user devices 504 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the user devices 504. In some implementations, the memory 510 may include multiple different types of memory, such as static random access memory (SRAM), dynamic random access memory (DRAM), ROM, etc.

Turning to the contents of the memory 510 in more detail, the memory 510 may include an operating system and one or more application programs or services for implementing the features disclosed herein. Additionally or alternatively, the memory 510 may include one or more services for implementing the features described herein such as a block volume restore service 538 capable of being used for the techniques described with reference to FIGS. 1-4.

The architecture 500 may additionally include one or more service provider computers 514 that may, in some examples, provide computing resources such as, but not limited to, client entities, low latency data storage, durable data storage, data access, management, virtualization, hosted computing environment or "cloud-based" solutions, etc. The service provider computers 514 may implement or be an example of one or more incremental snapshot processes, block volume restore processes, or one or more service provider computers (e.g., the computing devices) described herein with reference to FIGS. 1-4 and/or throughout the disclosure. The one or more service provider computers 514 may also be operable to provide site hosting, computer application development, and/or implementation platforms, combinations of the foregoing, or the like to the one or more users 502 via user devices 504.

In some examples, the networks 508 may include any one or a combination of many different types of networks, such as cable networks, the Internet, wireless networks, cellular networks, and other private and/or public networks. While the illustrated examples represent the users 502 communicating with the service provider computers 514 over the networks 508, the described techniques may equally apply in instances where the users 502 interact with the one or more service provider computers 514 via the one or more user devices 504 over a landline phone, via a kiosk, or in any other manner. It is also noted that the described techniques may apply in other client/server arrangements, such as set-top boxes, etc., as well as in non-client/server arrangements such as locally stored applications, peer-to-peer arrangements, etc. In embodiments, the users 502 may communicate with the facility computers 530 via networks 508, and the facility computers 530 may communicate with the service provider computers 514 via networks 508. In some embodiments, the service provider computers 514 may communicate, via networks 508, with one or more third party computers (not illustrated) to obtain data inputs for the various algorithms of the generation features described herein. In accordance with at least one embodiment, the service provider computers 514 may receive text data, video data, image data, one or more prompts, aggregated inputs generated from the foregoing, or the like for at least refining a prompt for a generative model.

The one or more service provider computers 514 may be or include any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 514 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or a distributed computing environment. In some examples, the one or more service provider computers 514 may be in communication with the user device 504 via the networks 508, or via other network connections. The one or more service provider computers 514 may include one or more servers, which may be arranged in a cluster or as individual servers not associated with one another. In embodiments, the service provider computers 514 may be in communication with one or more third party computers (not illustrated) via networks 508 to receive or to otherwise obtain data including text data, video data, image data, one or more prompts, aggregated inputs generated from the foregoing, or the like for at least refining a prompt for a generative model.

In one illustrative configuration, the one or more service provider computers 514 may include at least one memory, such as memory 516, and one or more processing units or one or more processors 518. The one or more processors 518 may be implemented as appropriate in hardware, computer-executable instructions, firmware, or any combination thereof. Computer-executable instruction or firmware implementations of the one or more processors 518 may include computer-executable or machine-executable instructions written in any suitable programming language to perform the various functions described when executed by a hardware computing device such as a processor. The memory 516 may store program instructions that are loadable and executable on the one or more processors 518, as well as data generated during the execution of these programs. Depending on the configuration and type of the one or more service provider computers 514, the memory 516 may be volatile, such as RAM, and/or non-volatile such as ROM, flash memory, etc. The one or more service provider computers 514 or servers may also include additional storage 520, which may include removable storage and/or non-removable storage. The additional storage 520 may include, but is not limited to, magnetic storage, optical disks and/or tape storage. The disk drives and their associated computer-readable media may provide non-volatile storage of computer-readable instructions, data structures, program services, and other data for the computing devices. In some implementations, the memory 516 may include multiple different types of memory, such as SRAM, DRAM, ROM, etc.

The memory 516, the additional storage 520, removable and/or non-removable, are examples of non-transitory computer-readable storage media. For example, computer-readable storage media may include volatile or non-volatile, removable or non-removable media implemented in any method or technology for storage of information such as computer-readable instructions, data structures, program services, or other data. The memory 516 and the additional storage 520 are examples of non-transitory computer storage media. Additional types of non-transitory computer storage media that may be present in the one or more service provider computers 514 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 514. Combinations of any of the above should also be included within the scope of non-transitory computer-readable media.

The one or more service provider computers 514 may also include one or more communication connection interfaces 522 that can allow the one or more service provider computers 514 to communicate with a data store, another computing device or server, user terminals, and/or other devices on the networks 508. The one or more service provider computers 514 may also include one or more I/O devices 524, such as a keyboard, a mouse, a pen, a voice input device, a touch input device, a display, speakers, a printer, etc.

Turning to the contents of the memory 516 in more detail, the memory 516 may include an operating system 526, one or more data stores 528, and/or one or more application programs or services for implementing the features disclosed herein including the block volume restore service 538. The architecture 500 includes facility computers 530. In embodiments, the service provider computers 514 and the block volume restore service 538 may be configured to generate and transmit instructions, via networks 508, to components 536 in communication or otherwise associated with facility computers 530. For example, the instructions may be configured to create a first incremental block volume snapshot or restore a block volume using a second incremental block volume snapshot determined by the block volume restore service 538. The facility computers 530 may include at least one memory, such as memory 532, and one or more processing units or one or more processors 534. The memory 532 may store program instructions, which may include one or more techniques as disclosed herein, that can be loaded and executed on the one or more processors 534, as well as data generated during the execution of these techniques. Depending on the configuration and type of the facility computers 530, the memory 532 may be volatile, such as random access memory (RAM), and/or non-volatile such as read-only memory (ROM), flash memory, etc. The facility computers 530 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the facility computers 530. In some implementations, the memory 532 may include multiple different types of memory, such as static random access memory (SRAM), dynamic random access memory (DRAM), ROM, etc.

Turning to the contents of the memory 532 in more detail, the memory 532 may include an operating system and one or more application programs or services for implementing the features disclosed herein. Additionally, the memory 532 may include one or more services for implementing the features described herein, which may include the block volume restore service 538. In some embodiments, the service provider computers 514 and the block volume restore service 538 may determine one or more snapshots to generate a restored block volume using. The user device 504 and the browser application 506 may be configured to transmit the output to the user 502. In accordance with at least one embodiment, the block volume restore service 538 may be configured to receive manifests, snapshots, block volume data, and the like. In some embodiments, some, a portion, or all of these input data may be stored and transmitted as text files or other files, which may include text data. In some embodiments, the block volume restore service 538 may be configured to implement one or more techniques for restoring a block volume using at least one manifest and at least one snapshot.

The block volume restore service 538 may be configured to generate and transmit a user interface or data objects for updating a user interface presented via browser application 506 and user device 504 for presenting information relating to a block volume, snapshot, manifest, or any components thereof or associated therewith to the user 502. Other graphical updates, feedback mechanisms, and data object generation associated with the incremental block volume restore features described herein may be implemented by the service provider computers 514 and/or the block volume restore service 538.

Any of the software components or functions described in this application, may be implemented as software code to be executed by a processor using any suitable computer language such as, for example, Java, C++, or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The figures and above description are illustrative and is not restrictive. In the above description, for the purposes of explanation, specific details are set forth in order to provide a thorough understanding of certain embodiments. However, it will be apparent that various embodiments may be practiced without these specific details. Many variations of the techniques described herein may become apparent to those skilled in the art upon review of the disclosure. The scope of the techniques can, therefore, be determined not with reference to the above description, but instead can be determined with reference to the pending claims along with their full scope or equivalents.

One or more features from any embodiment may be combined with one or more features of any other embodiment without departing from the scope of the techniques.

A recitation of "a," "an," or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
receiving, by a computing system, a request to create a restored block volume using a first manifest, the first manifest comprising: (i) a block identifier for a block and (ii) a first block sequence number corresponding to the block identifier and associated with a first snapshot, and (iii) a manifest identifier;
receiving, by the computing system, the request to create the restored block volume using a second manifest, the second manifest comprising: (i) the block identifier for the block, (ii) a second block sequence number corresponding to the block identifier and associated with a second snapshot;
determining, by the computing system, whether the second block sequence number is indicative of the block having been altered after the first manifest was generated; and
responsive to the determination by the computing system, creating the restored block volume.

2. The computer-implemented method of claim 1, wherein determining whether the second block sequence number is indicative of the block having been altered after the first manifest was generated further comprises:
comparing the second block sequence number to the manifest identifier; and
determining whether the second block sequence number was changed after the first manifest was generated.

3. The computer-implemented method of claim 2, further comprising:
comparing the first block sequence number to the second block sequence number.

4. The computer-implemented method of claim 2, wherein creating the restored block volume further comprises:
creating an empty block volume.

5. The computer-implemented method of claim 2, wherein determining whether the second block sequence number was changed after the second manifest was generated further comprises:
determining whether the second block sequence number is greater than the manifest identifier.

6. The computer-implemented method of claim 2, wherein determining whether the second block sequence number was changed after the first manifest was generated indicates that the second snapshot associated with the block identifier includes a more recent write operation to the block.

7. The computer-implemented method of claim 1, wherein creating the restored block volume further comprises:
creating the restored block volume with one of: (i) the first snapshot or (ii) the second snapshot.

8. The computer-implemented method of claim 7, wherein creating the restored block volume with one of: (i) the first snapshot or (ii) the second snapshot further comprises:
   creating the restored block volume with one of: (i) a first portion of the first snapshot or (ii) a second portion of the second snapshot.

9. The computer-implemented method of claim 1, wherein the first snapshot is a point-in-time capture of the block of a block volume and the second block sequence number is at least one of: a number, a character, or a hash value.

10. The computer-implemented method of claim 1, wherein altering the block includes at least one of: updating the block, allocating the block, or deallocating the block.

11. The computer-implemented method of claim 1, wherein the second manifest is generated, the generation further comprising:
   reading blocks in a memory volume to detect that the block has been altered;
   obtaining the first manifest associated with the first snapshot; and
   generating the second manifest by using the first manifest, the second manifest generated by using the second block sequence number, the second block sequence number generated by changing the first block sequence number included within the first manifest.

12. The computer-implemented method of claim 1, wherein the first manifest is based at least in part on a prior manifest, and wherein the second snapshot is a remotely stored snapshot.

13. The computer-implemented method of claim 1, further comprising:
   receiving, by the computing system, a second request to list a set of blocks included in the restored block volume.

14. The computer-implemented method of claim 1, wherein the second block sequence number is a predetermined value in accordance with the block being deallocated or the block being unallocated.

15. The computer-implemented method of claim 1, wherein the first block sequence number corresponds to the second block sequence number in accordance with the first block sequence number and the second block sequence number being associated with a same block identifier that corresponds to a same block.

16. A non-transitory computer-readable storage medium storing a plurality of instructions executable by one or more processors of a block volume restore system, the plurality of instructions cause, when executed by the one or more processors of the block volume restore system, the one or more processors to perform operations comprising:
   receiving, by the block volume restore system, a request to create a restored block volume using a first manifest, the first manifest comprising: (i) a block identifier for a block and (ii) a first block sequence number corresponding to the block identifier and associated with a first snapshot, and (iii) a manifest identifier;
   receiving, by the block volume restore system, the request to create the restored block volume using a second manifest, the second manifest comprising: (i) the block identifier for the block, (ii) a second block sequence number corresponding to the block identifier and associated with a second snapshot;
   determining, by the block volume restore system, whether the second block sequence number is indicative of the block having been altered after the first manifest was generated; and
   responsive to the determination by the block volume restore system, creating the restored block volume.

17. The non-transitory computer-readable storage medium of claim 16, wherein determining whether the second block sequence number is indicative of the block having been altered after the first manifest was generated further comprises:
   comparing the second block sequence number to the manifest identifier; and
   determining whether the second block sequence number was changed after the first manifest was generated.

18. The non-transitory computer-readable storage medium of claim 16, further comprising:
   comparing the first block sequence number to the second block sequence number.

19. The non-transitory computer-readable storage medium of claim 16, wherein creating the restored block volume with one of: (i) the first snapshot or (ii) the second snapshot further comprises:
   creating the restored block volume with one of: (i) a first portion of the first snapshot or (ii) a second portion of the second snapshot.

20. A block volume restore system, comprising:
   one or more data processors; and
   a computer-readable storage medium comprising instructions that, when executed on the one or more data processors, cause the one or more data processors to perform operations comprising:
   receiving, by the block volume restore system, a request to create a restored block volume using a first manifest, the first manifest comprising: (i) a block identifier for a block and (ii) a first block sequence number corresponding to the block identifier and associated with a first snapshot, and (iii) a manifest identifier;
   receiving, by the block volume restore system, the request to create the restored block volume using a second manifest, the second manifest comprising: (i) the block identifier for the block, (ii) a second block sequence number corresponding to the block identifier and associated with a second snapshot;
   determining, by the block volume restore system, whether the second block sequence number is indicative of the block having been altered after the first manifest was generated; and
   responsive to the determination by the block volume restore system, creating the restored block volume.

* * * * *